R. L. SMITH.
MACHINE FOR ATTACHING REVENUE STAMPS.
No. 47,464. Patented Apr. 25, 1865.
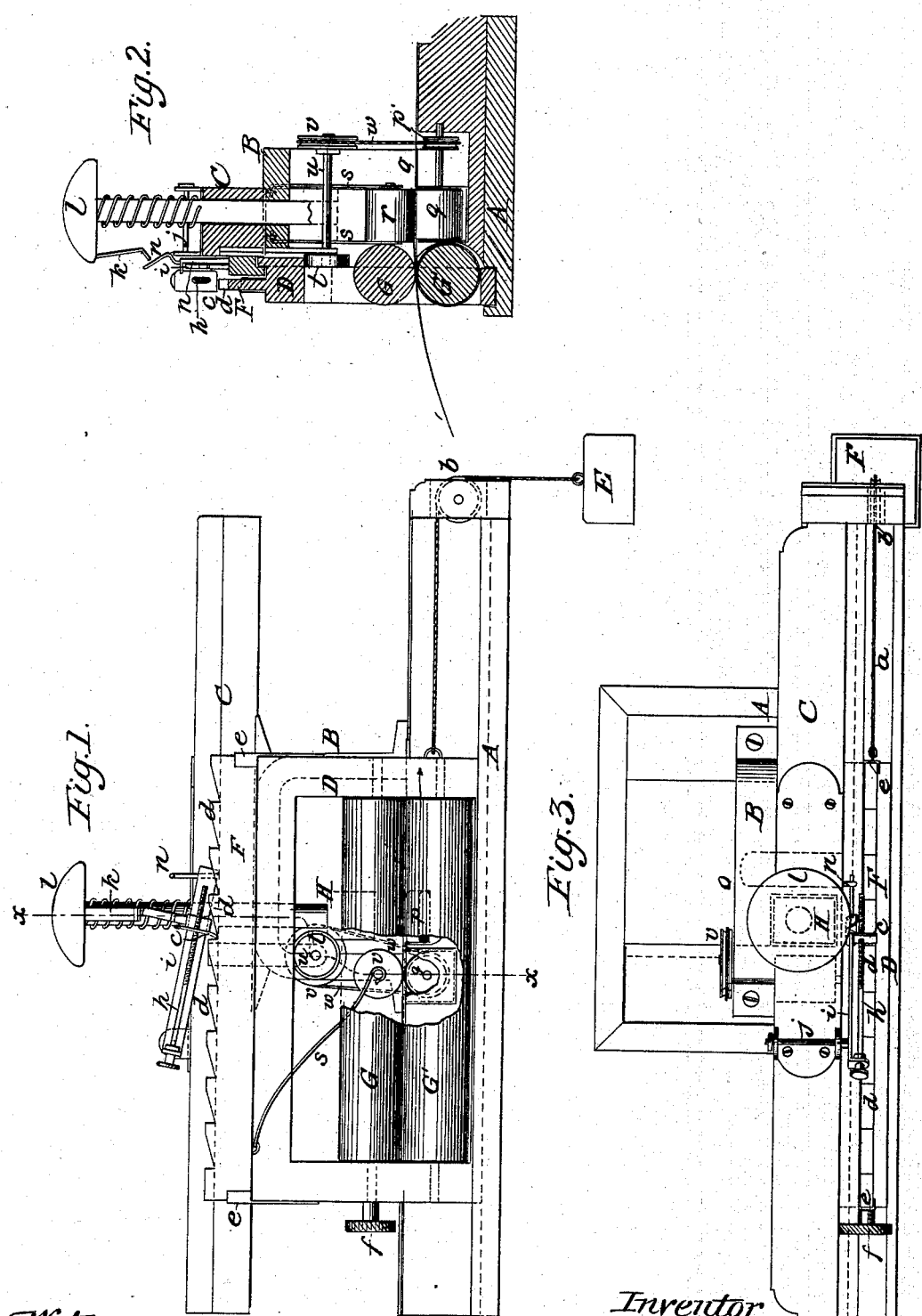

UNITED STATES PATENT OFFICE.

ROBERT L. SMITH, OF STOCKPORT, NEW YORK.

MACHINE FOR ATTACHING REVENUE-STAMPS.

Specification forming part of Letters Patent No. 47,464, dated April 25, 1865.

*To all whom it may concern:*

Be it known that I, ROBERT L. SMITH, of Stockport, in the county of Columbia and State of New York, have invented a new and Improved Machine for Attaching Revenue and other Stamps; and I do hereby declare that the following is a full, clear, and exact description thereof, which will enable others skilled in the art to make and use the same, reference being had to the accompanying drawings, forming part of this specification, in which—

Figure 1 is a front elevation of this invention. Fig. 2 is a transverse vertical section of the same, the line $x$ $x$, Fig. 1, indicating the plane of section. Fig. 3 is a plan or top view of the same.

Similar letters of reference indicate like parts.

The object of this invention is a machine which is so arranged that a whole sheet of revenue or other stamps may be placed in the same, and one after the other struck off and attached to a photographic card, letter, or other surface as fast as said cards, letters, &c., may be supplied, the sheet being automatically fed forward and the gum side of the same wet by a self-acting device as fast as they are struck off.

A represents a platform or bed, made of wood or any other suitable material, and provided with a standard, B, which forms the support for the beam C. The front edges of the platform A and beam C are grooved and form the guides for the frame or gate D. A weight, E, suspended from a cord, $a$, which runs over a pulley, $b$, in the end of the platform A and connects with the gate D, has a tendency to pull said gate in the direction of the arrow marked on it in Fig. 1, and a stop, $c$, which engages with one of the ratchet-teeth $d$, retains the gate and prevents the same following the action of the weight E. The ratchet-teeth $d$ are cut in the edge of a rack-bar, F, which is dropped between two brackets, $e$, rising from the ends of the gate D, and the pitch of said teeth is precisely equal to the width of the stamps to be attached, so that if the rack and gate are moved for the distance of one tooth the sheet, which moves with the gate, passes along for a distance exactly equal to the width of one stamp. For stamps of different width the rack-bar has to be removed and replaced by one with teeth of a different pitch.

The sheet of stamps is clamped between two rollers, G G', which have their bearings in the end pieces of the gate D, and in practice these rollers will be made long enough to take in a sheet of stamps of the ordinary size. The two rollers are pressed together by suitable springs or set-screws, and a button or handle, $f$, mounted on the end of the shaft of one of these rollers serves to turn the same and to adjust the sheet of stamps in the desired position. One or both these rollers may be covered with leather, cloth, or other suitable material, whereby the sheet is prevented from slipping.

The stop $c$, which engages with the teeth of the rack-bar F, is adjustable on the end of a screw-rod, $h$, and it is made to slide back and forth on an arm, $i$, which extends from an oscillating rod, $j$, having its bearings in lugs rising from the top surface of the beam C. By raising the loose end of the arm $i$ the stop $c$ is thrown out of gear with the teeth of the rack-bar, and the gate D is permitted to follow the action of the weight.

In order to raise the stop and release the gate automatically at the proper intervals, a spring-catch, $k$, is secured to the handle $l$, which serves to depress the plunger H, and as the handle is depressed the point of said catch glides over the inclined tappet $m$, rising from the stop $c$, or from the arm on which said stop moves, and as the handle is raised instantaneously, as soon as it is relieved from pressure by the action of a spring secured under it the point of the catch catches under a shoulder of the tappet and carries the arm $i$ with the stop $c$ up, releasing the gate and allowing the same to follow the action of the weight. The arm $i$, on being raised by the action of the catch $k$, strikes the stop $n$ and is instantaneously released, causing the stop $c$ to engage with the teeth of the rack-bar before the same has time to move more than one tooth. By this arrangement the full stroke of the plunger causes the gate with the sheet of stamps to move far enough to bring a new stamp under the plunger, which is provided with sharp cutting-edges, and on being depressed passes down in close proximity to the edges of the sheet-metal plates $o$, secured on the top surface of the platform A.

The cards, letters, or other surfaces to which the stamps are to be attached are placed by hand under the plunger, and by the combined action of the cutting-edges of the plunger and of the plate o those stamps which are fed under the plunger are cut off and depressed on the card, letter, or other surface.

In order to allow the card or other surface placed under the plunger to sink or descend from the metal edges of the plate o a spring-block, p, is fitted into the bed of the machine. Without this spring-block the stamp would not be carried down beyond the metal edges sufficiently to cut or tear it from the sheet. Said spring-block also serves to deaden the blow of the plunger and to reduce the strain on the hand of the operator.

The gummed surface of the stamps is wet by the action of a roller, q, which revolves in a well cut into the platform A and partially filled with water. This roller is covered with cloth or other absorbent material, and the stamps are held in contact with it by a roller, p, which has its bearings in two oblique arms, s, which are pivoted to the under surface of the beam C. A rotary motion is imparted to the absorbent roller q by the action of an elastic roller, t, mounted on a shaft, u, which has its bearings in suitable boxes secured to the standard B.

The circumference of the elastic roller t bears against the lower edge of the upper rail of the gate D, and a pulley, v, mounted on the end of the shaft u, connects by a belt, w, with a pulley, p', mounted on the shaft of the absorbent roller. Whenever the gate moves, a rotary motion is imparted to the shaft u and through it to the absorbent roller.

The operation is as follows: First, push the gate back in the direction opposite the arrow marked on it in Fig. 1 of the drawings until the ends of the feed-rollers clear the absorbent roller then enter the sheet of stamps between the feed rollers and adjust it so that one row of stamps will be in line with the plunger; move the gate forward in the direction of the arrow marked on it in Fig. 1 of the drawings until one stamp is in the proper position under the plunger; adjust the card, letter, or other article on the spring-block p, and by depressing the plunger the stamp is struck off and made to stick to the surface of the article under the plunger. On releasing the plunger it is carried up by the action of the spring under the handle, the stop c is raised sufficiently long to allow the gate to move one tooth, and a new stamp is carried under the plunger. In passing to the plunger the stamps are brought in contact with the absorbent roller and their gummed surface is wet, causing them to adhere readily to the surface of the article to which they are to be attached. After a whole row of stamps has been struck off the gate is moved back, a new row of stamps is brought in line with the plunger, and the operation commences again.

I claim as new and desire to secure by Letters Patent—

1. The rack-bar F and gate D, with feed-rollers G G', and subjected to the action of a weight or spring, in combination with an automatic stop, c, and plunger H, all constructed and operating substantially as and for the purpose set forth.

2. Making the rack-bar F removable, substantially as described, so that the machine can be readily adjusted for stamps of different width.

3. The oscillating arm i and tappet m, in combination with the stop c, rack-bar F, handle l, and plunger H, constructed and operating substantially as and for the purpose specified.

4. The feed-rollers G G', arranged in the longitudinal sliding gate D, and operating in combination with the absorbent roller q and plunger H, substantially as and for the purpose set forth.

5. The employment of the elastic spring-block p, or its equivalent, in combination with the plunger H and metal edges o, substantially as and for the purpose described.

ROBERT L. SMITH.

Witnesses:
H. S. VAN DE CARE,
JAS. WHITLOCK.